UNITED STATES PATENT OFFICE.

ROBERT A. G. CALE, OF PARIS, ONTARIO, CANADA.

WALL-COATING AND PROCESS OF MAKING SAME.

969,035.   Specification of Letters Patent.   Patented Aug. 30, 1910.

No Drawing.   Application filed January 15, 1908.   Serial No. 411,144.

*To all whom it may concern:*

Be it known that I, ROBERT A. G. CALE, of the town of Paris, in the Province of Ontario and Dominion of Canada, have invented certain new and useful Improvements in Wall-Coating and Process of Making Same, of which the following is a full, clear, and exact description.

This invention relates to a wall coating or finishing compound and the main object is to produce a wall finish which may be mixed with equal facility in either cold or hot water and be ready for immediate application, and which will dry evenly and slowly on either porous or non-absorbent surfaces.

A further object is to produce a wall coating that will not run or crawl on the wall; that will not reproduce stains; rub, flake, crack or peel off; and which may be applied with great ease and rapidity.

The invention consists essentially in utilizing the mucilaginous extract of slippery elm bark, in suitable proportions, in combination with a well known base such as china clay, chalk, dry paints, or other pigment, together with a binding material consisting preferably of glue. The slippery elm bark is of such a nature and has such properties, when combined with the other materials mentioned, as to prevent the heavy pigments from separating or precipitating when the coating is being prepared for use or when standing in the receptacle within which it is mixed. The mucilaginous extract holds the pigments in suspension so that the mixture is of even consistency throughout. The slippery elm bark also retards the drying of the wall finish during the application thereof and thereby effectually prevents laps or clouds, thus allowing one operator to successfully coat a large area and secure an even and uniform surface.

In the manufacture of wall coatings, it is essential to use a base such as china clay (silicate of aluminum), whiting (carbonate of lime), or other suitable pigment, together with a binding material such as glue. The glue in the proportion of approximately five per cent. (5%) is dissolved with a suitable quantity of water and added to the base, the two ingredients being thoroughly mixed together.

In the present invention the above named or similar constituents, in suitable proportions, may be mixed together by any well known method, and so far the material is not different from that already in common use.

My invention consists in adding to the above mixture a suitable quantity of the mucilaginous extract obtained from slippery elm bark (*Ulmus fulva*). The bark is ground or broken up and is then thoroughly soaked in a suitable quantity of water. After soaking for a sufficient length of time, the mucilaginous extract is strained under pressure from this mass and is then added to the mixture of the base and glue. The proportion of the elm bark from which the mucilaginous extract is extracted is less than three per cent. (3%), while that of the base is more than ninety per cent. (90%), by weight, of the whole mass. After being thoroughly mixed in any suitable manner, the composition is then dried and ground to a suitable fineness for wall coatings.

The slippery elm bark may be added to the base in a finely ground state, although I prefer to use it in the manner above described. It will be understood that the mucilaginous extract as well as the base and binder may be mixed together in various proportions and although I do not wish to confine myself strictly to any particular quantities, I regard it as essential that the base shall constitute more than ninety per cent. (90%) of the finished product, and the slippery elm bark less than three per cent. (3%) of the whole mass, by weight.

In preparing the wall finish for application, the material should be mixed in about the proportion of one pound of material to one pint of water and then stirred until thoroughly dissolved or mixed when it will be ready to apply with an ordinary calcimine brush. The water may be cold or hot to suit the convenience of the operator or the surface to which it is to be applied. The nature of the material allows it to be applied on very absorbent walls without the usual primary coat of sizing. Moreover, large quantities can be lifted on the brush without inconvenience to the user. The mucilaginous extract tends to prevent the moisture from being quickly withdrawn from the material either by suction from absorbent surfaces, or by the dryness of the atmosphere, thus preventing lapse, clouds or stains.

Having thus described my invention, what I claim is:—

1. A wall coating composition consisting of a mixture of a suitable base and animal glue, in combination with the mucilaginous extract of slippery elm bark.

2. A wall coating composition consisting of aluminum silicate over ninety per cent. (90%), mucilaginous extract of slippery elm bark less than three per cent. (3%), and the remainder animal glue.

3. A wall coating composition consisting of more than ninety per cent. (90%) of a suitable base, less than three per cent. (3%) of the mucilaginous extract of slippery elm bark, and the remainder of animal glue.

4. A wall coating composition consisting of aluminum silicate, animal glue, and slippery elm bark, thoroughly mixed together and ground to suitable fineness, substantially as described.

5. The process of preparing a wall coating composition which consists in thoroughly mixing a suitable base with animal glue, adding to said mixture a quantity of slippery elm bark, thoroughly mixing the whole mass, and afterward drying and grinding the material to suitable fineness, substantially as described.

6. A method of making wall coating composition which consists in soaking slippery elm bark and straining the mucilaginous extract therefrom under pressure, and afterward thoroughly mixing the extract with suitable proportions of animal glue and a base material, then drying and grinding the mass, substantially as described.

In witness whereof I have hereunto set my hand in the presence of two witnesses.

ROBERT A. G. CALE.

Witnesses:
 KATHLEEN O'GRADY,
 LAURA CHRYSLER.